May 8, 1923.
E. G. CLEMENTS
1,454,576
TRANSMISSION LOCK MECHANISM FOR AUTOMOBILES
Filed Sept. 23, 1919
4 Sheets-Sheet 2
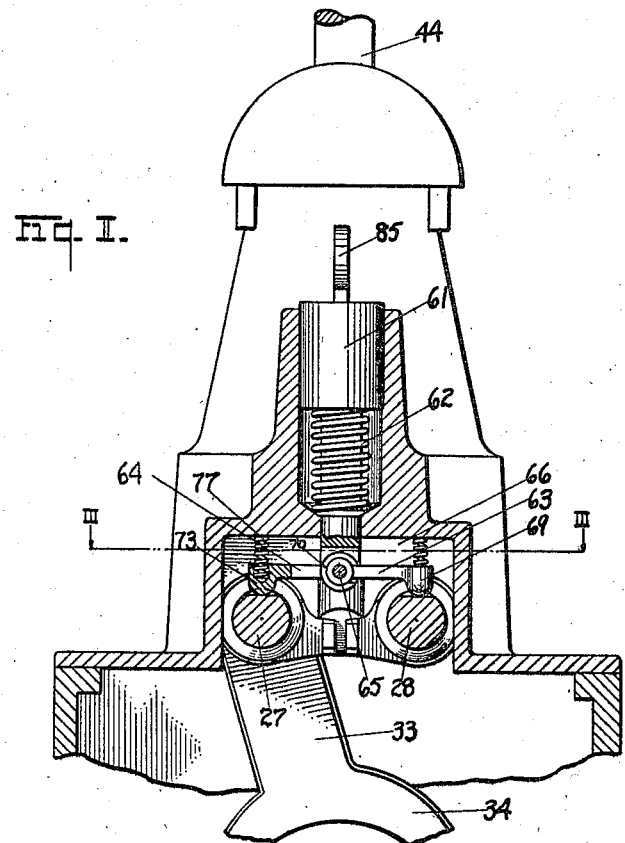
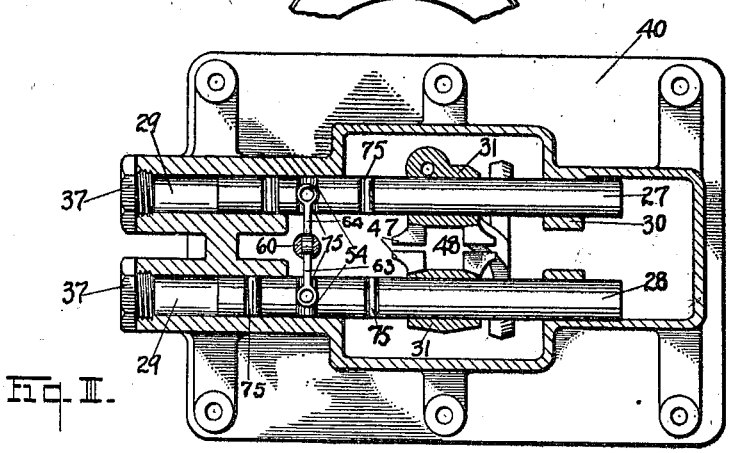
INVENTOR.
Everett G. Clements.
BY Chester W. Braselton
ATTORNEY.

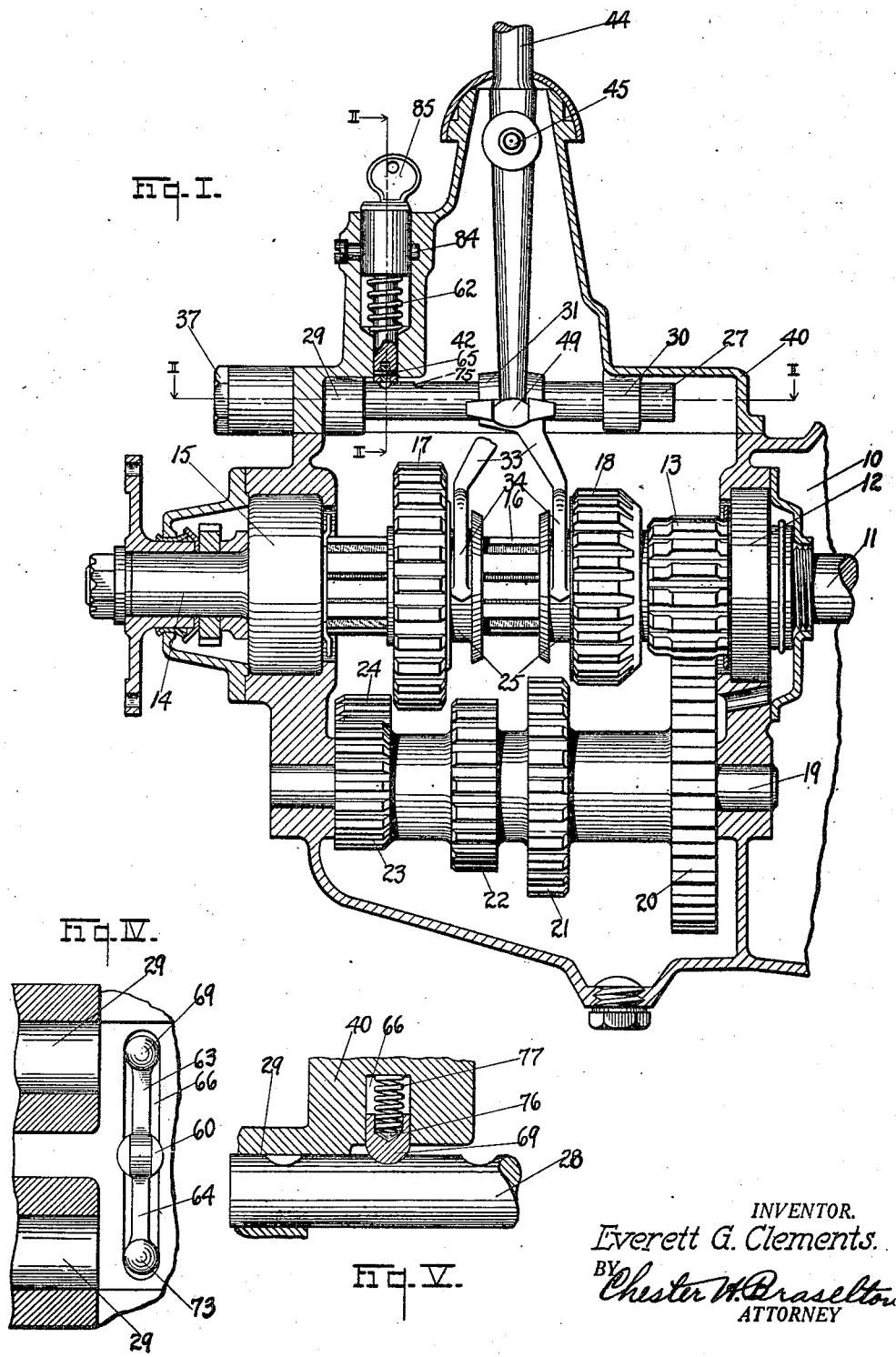

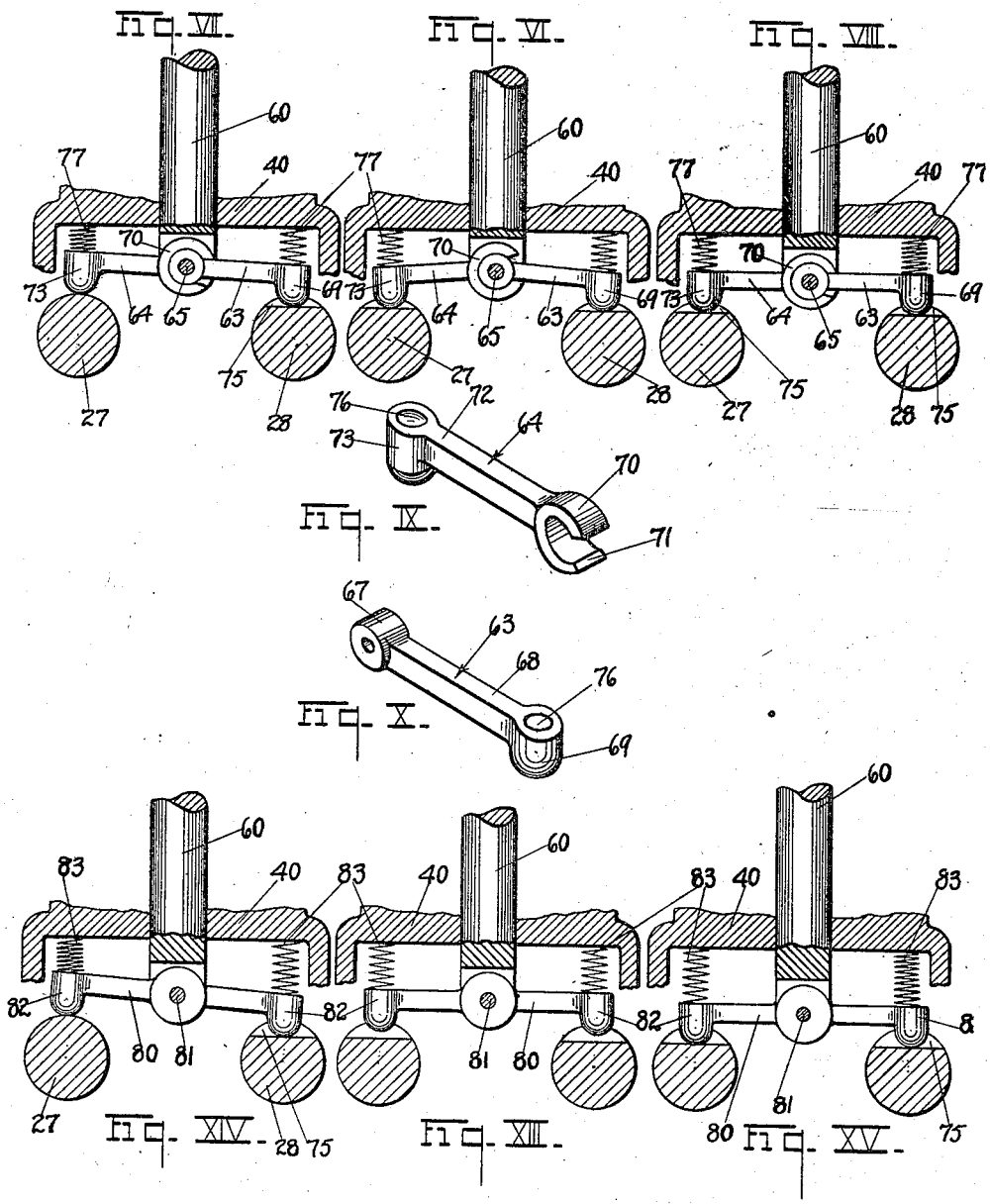

May 8, 1923.
E. G. CLEMENTS
1,454,576
TRANSMISSION LOCK MECHANISM FOR AUTOMOBILES
Filed Sept. 23, 1919
4 Sheets-Sheet 4
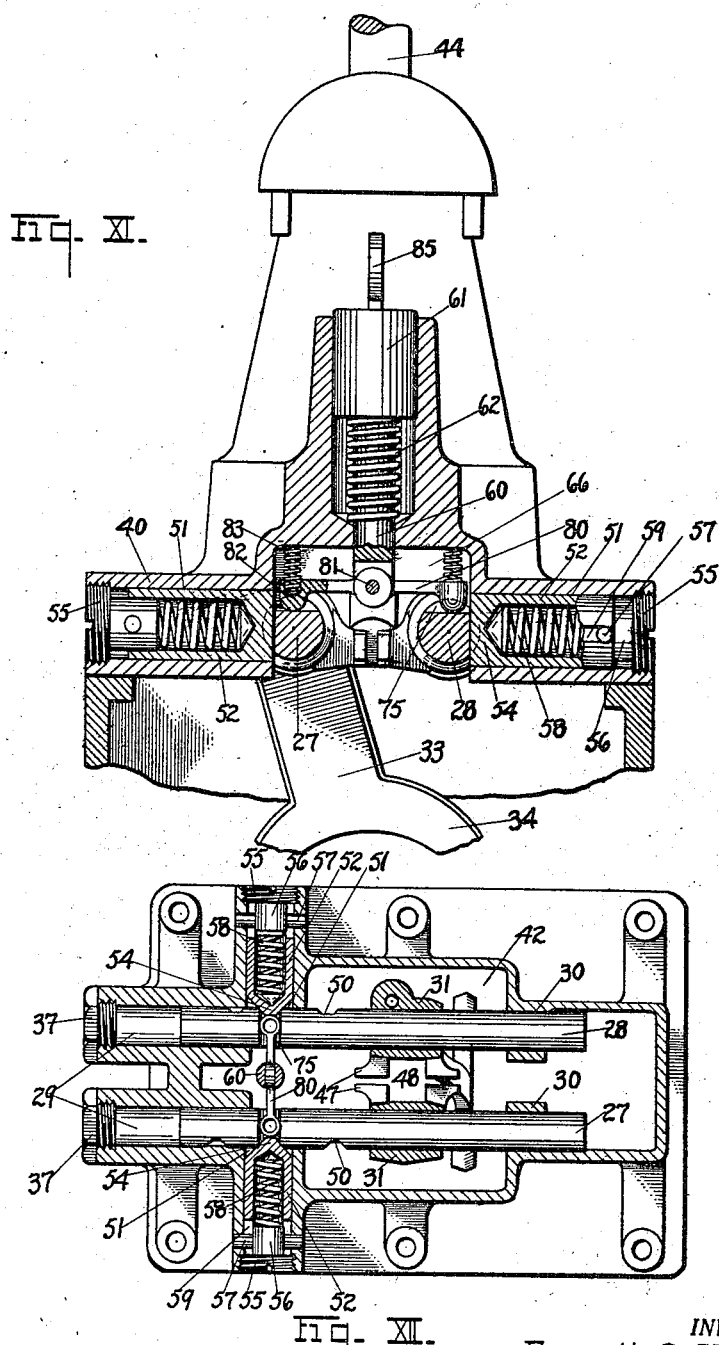
INVENTOR.
Everett G. Clements.
BY
Chester W. Braselton
ATTORNEY Patented May 8, 1923.

1,454,576

UNITED STATES PATENT OFFICE.

EVERETT G. CLEMENTS, OF WASHINGTON, DISTRICT OF COLUMBIA, ASSIGNOR TO THE WILLYS-OVERLAND COMPANY, OF TOLEDO, OHIO, A CORPORATION OF OHIO.

TRANSMISSION-LOCK MECHANISM FOR AUTOMOBILES.

Application filed September 23, 1919. Serial No. 325,674.

*To all whom it may concern:*

Be it known that I, EVERETT G. CLEMENTS, residing at Washington, District of Columbia, have invented certain new and useful Improvements in Transmission-Lock Mechanism for Automobiles, of which I declare the following to be a full, clear, and exact description.

This invention relates to transmission lock mechanism for automobiles, more particularly to a mechanism adapted to lock the movable gears against movement when desired so as to prevent operation of the automobile by an unauthorized person.

One object of the invention is to provide mechanism of this character for locking the controlling mechanism to prevent movement of the sliding gears.

A further object of the invention is to provide a mechanism of the character described for interlocking the shifter members and thus positively retain one of the movable gears in neutral position at all times.

A further object of the invention is to provide a mechanism of this character for preventing the engagement of more than one of the movable gears with one of the gears on the countershaft at any time, and at the same time providing means for locking the gear controlling mechanism.

A further object of the invention is to provide a mechanism of the character described which is of simple construction and efficient in operation.

Further objects of this invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention is illustrated in the accompanying drawings forming a part hereof in which:

Figure I is a vertical longitudinal section through the transmission casing of an automobile showing the relative position of the operating mechanism with respect to the transmission shaft.

Figure II is a transverse sectional view, taken along the line II—II of Figure I and illustrating the preferred form of locking mechanism.

Figure III is a horizontal sectional view, taken along the line III—III of Figure II.

Figure IV is a detail view, partially in section, illustrating the detents as viewed from below.

Figure V is a detail view, partially in section, illustrating the position of one of the detents with respect to the shifter member.

Figure VI is a tranverse sectional view, illustrating the position of the detents with respect to the shifter members when the parts are in such position as to permit the movement of either shifter member relative to the other.

Figure VII is a detail sectional view, similar to that shown in Figure VI, wherein one of the shifter members has been moved from its neutral position.

Figure VIII is a detail sectional view, similar to Figure VII, wherein the plunger is depressed to lock both shifter members in neutral position.

Figure IX is a perspective view of one of the detent members.

Figure X is a perspective view of the other detent member which is adapted to co-operate with the detent member shown in Figure IX.

Figure XI is a transverse sectional view, similar to that shown in Figure II, wherein a somewhat modified form of lock mechanism is employed.

Figure XII is a transverse sectional view, similar to Figure III, illustrating the position of the parts when the modified form of lock mechanism is employed.

Figure XIII is a detail transverse sectional view, illustrating the position of the locking mechanism when the shifter members are both in neutral position and when the mechanism is in position to form an interlock between the shifter members.

Figure XIV is a detail sectional view, similar to that shown in Figure XIII, and illustrating the position of the modified form of locking mechanism when one of the shifter members is moved from its neutral position.

Figure XV is a detail sectional view, similar to that shown in Figure XIV, and illustrating the position of the modified form of locking mechanism, when both shifter members are locked in neutral position.

Referring to the drawings 10 indicates a transmission mechanism of the conventional type having a driving element or power shaft 11 extending within the casing, and rotatably mounted in a bearing 12 positioned in one end thereof. The driving element or power shaft is adapted to be operatively connected with an engine (not shown), and carries a driving pinion 13 firmly secured thereto within the casing. A drive shaft 14 is rotatably mounted in a bearing 15 carried by the casing, and is so positioned as to be in axial alignment with the power shaft 11. The end of the drive shaft 14 which extends within the transmission casing is provided with a plurality of splines 16 so arranged as to permit movement of the movable gears 17 and 18 carried by the drive shaft in a direction longitudinally of the shaft, and at the same time prevent rotation of these gears with respect to the shaft. A countershaft 19 is also mounted in bearings carried by the casing, and is positioned substantially parallel to the longitudinal axis of the drive shaft 14. A plurality of gears 20, 21, 22 and 23 are firmly secured to the countershaft and rotatable therewith. The gear 20 is continually in mesh with and constantly driven by the pinion 13 secured to the end of the power shaft. The gears 21, 22 and 23 are thus constantly rotated from the driving pinion 13. A gear 24 is carried by a fixed shaft (not shown) and is constantly in mesh with and continually rotated by the gear 23 carried by the countershaft. The movable gears 17 and 18 are each provided with a shifting collar 25 for engagement by the shifting arms, whereby the said gears may be moved in a direction longitudinally of the drive shaft. The pinion 13 is adapted to be constantly rotated by the movement of the power shaft 11, thus communicating rotative movement to the gear 20 and the countershaft 19 together with the gears 21, 22 and 23 carried by the countershaft, and the gear 24 which is constantly in mesh with the gear 23. The gears 17 and 18 are shown in Figure I as occupying their neutral positions in which they are out of mesh with the gears carried by the countershaft, and so positioned that the power shaft rotates freely without communicating rotative movement to the drive shaft. When the movable gear 18 is moved forwardly into engagement with the pinion 13, a clutch mechanism (not shown) is provided for securing driving engagement between the adjacent faces of the gear 18 and the pinion 13, whereby the drive shaft is directly operated from the power shaft. If, however, the movable gear 18 is moved rearwardly a sufficient distance it will be placed in mesh with the gear 21 carried by the countershaft, whereby rotative movement will be imparted to the drive shaft from the power shaft through the countershaft 19, and in the same direction as by engagement of the gear 18 with the driving pinion 13 but at a lower speed. If the movable gear 17 is moved in a forwardly direction, it is placed in mesh with the gear 22 carried by the countershaft whereby rotative movement is imparted to the drive shaft through the countershaft, in the same direction as the rotative movement imparted to the shaft by means of the gear 18 but at a lower rate of speed, as will be evident from comparing the relative sizes of the gears 17 and 22. When the movable gear 17 is moved in the opposite direction, towards the rear, it will be placed in mesh with the gear 24 whereby rotative movement will be imparted to the drive shaft in a direction opposite to that in which it would be rotated under the several conditions previously described.

The mechanism above described comprises the conventional form of transmission mechanism commonly employed in automobiles, so arranged as to enable the drive shaft to be rotated at various degrees of speed, and also making it possible to reverse the direction of rotation of the drive shaft when desired. It is obvious that various difficulties would be encountered if through accident or otherwise the movable gears 17 and 18 should both be placed in mesh at the same time with one of their meshing gears. It is highly desirable, therefore, to provide mechanism which will retain one of these gears in neutral position whenever the other gear is moved from neutral position, and to retain the gear which has been moved in its proper meshing position and thus prevent its accidental disengagement from the gear with which it is placed in mesh. Moreover, it is desirable to provide means for locking both gears in neutral position whereby any movement of either gear from this position can be prevented, thus locking the gears against operative engagement and preventing operation of the automobile when the gears are thus locked. In order to provide mechanisms for properly controlling movement of movable gears 17 and 18, a pair of longitudinally slidable members 27 and 28 are slidably mounted in oppositely positioned registering bearings 29 and 30 formed in the casing cover. The longitudinally slidable members are so positioned as to extend substantially parallel with each other at all times.

Each of these members has firmly secured thereto a collar 31 clamped in position thereon in any suitable manner, each of said collars being provided with a downwardly extending arm 33 having forked ends 34 adapted to partially embrace one of the shifing collars 25 in such a manner as to control the movement of one of the movable gears.

The collars 31, together with the downwardly extending arms 33 and forks 34 are of similar construction and are so arranged that they control one of the gears 17 and 18. Screw caps 37 are adapted to be firmly secured in the ends of the bearings 29 formed in the casing cover for the purpose of properly closing the bearings to prevent foreign matter from becoming lodged therein. A recess 42 is formed in the casing cover for the purpose of permitting free movement of the collars 31 and their associated parts in a direction longitudinally of the casing.

The casing cover 40 is secured to the upper surface of the transmission casing by means of bolts or other suitable fastening means which serve to firmly secure the cover and the mechanism supported thereby securely in position relative to the operating parts of the transmission mechanism. A control lever 44 is pivotally mounted at 45 in the casing cover so that the control lever pivots freely on the point 45. The collars 31 are oppositely positioned upon the members 27 and 28, each of said collars being provided with a pair of inwardly extending ears 47, so positioned as to provide oppositely extending registering slots 48. The control lever 44 is provided with a squared portion 49 at its lower end, which is positioned within the space formed by the oppositely extending slots 48 to control the movement of the longitudinally slidable members 27 and 28 by exerting pressure against the ears 47. The control member 44 is so mounted that the lower end thereof is capable of moving in a direction longitudinally of the casing, and is also capable of a slight movement in a transverse direction within the slots 48.

A reciprocal plunger 60 is preferably mounted for vertical movement within the casing cover, the said plunger being provided with an enlarged portion 61 within which is housed suitable key operated lock mechanism for locking the plunger in depressed position. A coil spring 62 surrounds a portion of the plunger and is adapted to bear at one end against the enlarged portion of the plunger for the purpose of moving the same upwardly upon the release of the key operated locking mechanism. In the preferred form of locking mechanism particularly illustrated in Figures II to X inclusive, a pair of oppositely positioned detent members 63 and 64 are pivoted to the downwardly extending portion of the plunger as at 65, said detents being capable of limited movement independently of each other. A transverse recess 66 is formed in the casing cover for the reception of the lower portion of the plunger and the oppositely extending detents 63 and 64, the recess being of such dimensions as to permit the necessary movement of the plunger and of the detents relative to each other. The detent 63 is provided with a cylindrical portion 67 which is rotatably mounted upon the pivot 65, while an arm 68 extends upon this cylindrical portion 67 and is provided at the opposite end thereof with a lug 69 for co-operation with one of the stops carried by one of the shifter members. The detent 64 is provided with a sleeve portion 70 having a slot 71 formed therein, and an arm 72 extends outwardly from the sleeve 70 and is provided with a lug 73 at the opposite end thereof, the lug 73 being similar in all respects to the lug 69 previously described. When the above described parts are in assembled position the cylindrical portion 67 of the detent 63 is pivotally mounted upon the pivot 65 carried by the lower end portion of the plunger while the sleeve 70 of the detent 64 is mounted upon the cylindrical portion 67 of the detent 63 so that the arm 68 of the detent 63 is positioned within the slot 71 the edges of which act as stops to prevent excessive movement of the detent 63 relative to the detent 64. Stops 75 are formed in each of the shifter members, being so positioned as to be in registering position relative to the corresponding detent when the shifter member is in neutral or either operative position. Each of the detents is provided with a recess 76 formed upon the upper side thereof adjacent the lugs 69 and 73, each of these recesses being adapted to house one end of a coil spring 77, the opposite end of which bears against the casing cover, the spring serving to urge the detent into engagement with one of the stops 75.

It will be seen upon reference to Figures VI, VII and VIII of the drawings, that the mechanism just described serves to determine the position of the slidable members and gears controlled thereby in their two positions of meshing engagement with the gears co-operating therewith, and in neutral position intermediate the same. When the middle stop of each member is in engagement with the corresponding lug, the movable member is in its neutral position, as is also the slidable gear which is controlled thereby. While the pressure exerted upon the lugs by the springs 77 is such as to normally force the lugs into engagement with the stops in the slidable members, the pressure exerted by the same is regulated in such a manner as to permit the lugs to move out of engagement with the stops when either of the slidable members is actuated for the purpose of changing its position with respect to the other slidable member and placing the gear controlled thereby into or out of mesh with one of its two cooperative gears. The purpose of this arrangement of the parts is to prevent the accidental movement of either of the movable members from either of its operative positions when not actuated by the control lever and to insure proper centering of each slidable member in either neutral or operative position.

In Figure VI of the drawings the position of the detents is shown when both of the movable members are located in neutral position, and when the reciprocable plunger is in its upper position of movement. In this position of the parts either one of the detents is capable of moving upwardly a slight distance to enable the lug formed upon the end thereof to move out of the stop in the movable member. In Figure VII of the drawings the position of these parts is shown when one of the movable members is moved from its neutral position whereby the detent co-operating therewith passes out of the stop and slides upon the upper surface of the movable member. It will be seen from this figure that in this position of the parts the opposite detent is prevented from moving upwardly, and is retained in position within the stop formed upon the movable member with which it co-operates. In Figure VIII of the drawings the mechanism is shown in the position wherein the reciprocable plunger is locked in its lowered position whereby the lower end portion of the plunger is depressed a sufficient distance so as to prevent the upward movement of either one of the detents carried thereby and thus both movable members are locked in their neutral position by means of the oppositely extending detents.

In the modified form of the invention illustrated in Figures XI to XV inclusive, an integral rocker arm 80 is substituted for the oppositely positioned independently movable detent members, said rocker arm being pivoted to the lower end portion of the plunger 60 as at 81 and being provided at opposite ends thereof with downwardly extending lugs 82 adapted for engagement with the stops 75 formed in the shifter members. Coil springs 83 are provided, one end of each of which is positioned within a suitable recess formed in the upper surface of one end portion of the arm 80, while the opposite end of the spring rests against the upper surface of the casing in such a manner as to urge the lug 82 into engagement with the stop formed in the movable member. In Figure XIII of the drawings the plunger is shown in its uppermost position wherein the rocker arm 80 is so positioned that the oppositely extending lugs 82 engage with the stops 75 formed in the shifter members so as to enable one shifter member to be moved from its neutral position, but to provide interlocking means for the other movable member as shown in Figure XIV, so that only one of these shifter members can be moved from its neutral position at the same time. In Figure XV of the drawings the plunger 60 is shown in a depressed position wherein the lugs 82 each fit within the stop 75 formed upon the movable members and closely engaged with the same so as to positively prevent the movement of either of the shifter members from its neutral position.

When it is desired to lock the mechanism to prevent operation of the automobile, the enlarged upper portion of the plunger is forced downwardly and the plunger is secured in this depressed position by means of the bolt 84 actuated by the key 85 whereby the lower end portion of the plunger 60 is locked in the depressed position as shown in Figures VIII and XV wherein the detents or rocker arm is forced into close engagement with the stops formed in the shifter members to positively prevent the movement of either of these members from their neutral positions.

In this form of the invention, each of the longitudinally movable members is provided with a plurality of depressions or grooves 50 formed near one end thereof, and spaced from each other longitudinally of the member for a purpose which will now be described. In the present instance the grooves or depressions formed in each rod are three in number and the several grooves are of substantially the same depth. Transversely extending passages 51 are formed within the casing cover in the same plane with the bearings 29 provided for the longitudinally slidable members and in communication with the bearings 29. A pawl mechanism 52 is adapted to be positioned within each of the transverse passages 51 so as to register with the grooves or depressions 50 formed in the outer side portion of each slidable member 27 and 28. Each of the pawls 52 is adapted to slide freely within one of the passages 51, and each of the pawls is provided with a wedge shaped end portion, the point 54 of which is adapted to fit within one of the grooves or depressions formed in one of the longitudinally slidable members. A screw cap 55 is threaded within the outer end of each of the passages 51 so as to entirely close the same, each of the caps 55 being provided with an inwardly projecting portion 56, and a pin 57 is passed through registering openings formed in the wall of the passages 51 and the portion 56 of the cap 55 to firmly hold the cap 55 in position after it is threaded within the passage. Each of the pawls 52 is provided with a hollow interior recess within which is positioned a coil compression spring 58, one end of which bears against the pawl 52 while the opposite end thereof seats upon the inwardly projecting portion 56 of the cap 55 to constantly force the pawl 52 into engagement with one of the longitudinally slidable members. Each of the pawls 52 is further provided with a pair of oppositely positioned grooves 59 extending longitudinally thereof and so positioned as to be guided by the oppositely extending end portions of the pin 57 and thus control the movement of the pawl and prevent its rotation within the passage 51.

Each of the grooves 50 is so positioned in the corresponding slidable member as to determine the position of the slidable member and the gear controlled thereby in its two positions of meshing engagement with the gear co-operating therewith, and in neutral position intermediate the same. When the middle groove or depression of each member is in engagement with the corresponding slidable pawl 52 co-operating therewith, the movable member is in its neutral position as is also the slidable gear which is controlled thereby. While the pressure exerted upon the pawls 52 by the compression springs is such as to normally force the pawls into engagement with the grooves or depressions in the sides of the slidable members, the pressure exerted by the same is regulated in such a manner as to permit the pawls to be moved outwardly out of engagement with the grooves or depressions when either of the slidable members is actuated for the purpose of changing its position with respect to the other slidable member and placing the gear controlled thereby into or out of mesh with one of its two co-operative gears. The purpose of the mechanism just described is to prevent the accidental movement of either of the movable members from either of its operative positions when not actuated by the control lever.

In the perferred form of the invention, the lugs 69 and 73 are forced into contact with the slidable members by the coil springs 77 and engage the stops 75 to insure proper positioning of the slidable members and the gears carried thereby so that the gears are retained in neutral or proper meshing engagement at all times. In this form each member is provided with three stops 75, thus insuring the retaining of each gear properly centered in either of its adjusted positions.

In the modified form of the invention shown in Figures XI to XV inclusive, each slidable member is provided with only one stop 75, each stop being arranged to register with the corresponding lug 82 when the slidable member is in its neutral position. The pawls 52, and grooves 50, co-operate to insure suitable centering of the slidable members in each adjusted position and thus make proper operation of the parts in each position a certainty.

It will be seen from the above description that the mechanism herein described provides means for interlocking the shifter members relative to each other whereby proper position of the shifter members is insured in each of its adjusted positions. Moreover, when the plunger is in depressed position and is held in such position by the key operated locking mechanism both of the shifter members are positively locked in neutral position whereby none of the gears can be placed in mesh and the automobile may not be operated by an unauthorized person.

While I have shown and described in considerable detail a specific embodiment of my invention, it is to be understood that this showing and description is illustrative only and for the purpose of rendering my invention more clear, and that I do not regard the invention as limited to the details of construction illustrated or described except in so far as I have included such limitations within the terms of the following claims, in which it is my intention to claim all novelty inherent in my invention broadly as well as specifically.

What I claim as new and desire to secure by Letters Patent is:—

1. In combination with a transmission mechanism, a pair of shifter members each of which is provided with a stop, a plunger having one end located adjacent said shifting members, and independently movable members carried by the plunger for engaging the stops upon the shifter members and means for depressing the plunger to provide a lock between said shifter members.

2. In combination with a transmission mechanism, a pair of shifter members each of which is provided with a stop, a plunger having one end located adjacent said shifter members, independently movable members and carried by the plunger for engaging the stops upon the shifter members, and means depending upon the position of said plunger for holding said movable members immovably engaged in said stops thereby locking said shifter members.

3. In a device of the character described, a pair of movable shifter members each of which is provided with a stop, a reciprocable plunger positioned adjacent the shifter members, and a pair of detents mounted for independent pivotal movement on said plunger and adapted to engage the stops on the shifter member.

4. In a device of the character described, a pair of shifter members each of which is provided with a stop, a reciprocable plunger positioned adjacent the shifter members, a pair of detents mounted for independent pivotal movement on said plunger and adapted to engage the stops on the shifter members, and resilient means for urging said detents into engagement with the shifter members.

5. In combination with a transmission mechanism, a pair of shifter members each of which is provided with stops, a plunger having one end located adjacent said shifting members, and independently movable members carried by the plunger for engaging the stops upon the shifter members and means including said plunger for preventing the said independent movement and holding the said members properly centered in their respective operative positions.

6. In a device of the character described, a pair of movable shifter members each of which is provided with stops, a reciprocable plunger positioned adjacent the shifter members, and a pair of detents mounted for independent pivotal movement on said plunger and adapted to engage the stops on the shifter members for centering said members in operative position.

7. In a device of the character described, a pair of shifter members each of which is provided with a plurality of stops, a reciprocable plunger positioned adjacent the shifter members, a pair of detents mounted for independent pivotal movement on said plunger and adapted to engage the stops on the shifter members in their operative positions, and resilient means for urging said detents into engagement with the shifter members and means on said detents adapted to prevent relative movement therebetween when said plunger has reached its limit of movement in one direction.

8. In a device of the character described, a pair of shiftable members having stops therein, a pair of detents extending in opposite directions from a common center intermediate said members, and cooperating means on said detents for limiting the pivotal movement thereof.

9. In a device of the character described, a pair of shiftable members having stops therein, a pair of detents pivoted at a common center for engaging said stops, means for limiting the relative angular movement between said detents and means for shifting said pivotal center whereby either of said members may be shifted or both of said members locked.

10. In a device of the character described, a pair of slidable shifting fork members having spaced notches therein, a pair of detents extending in opposite directions from a common pivotal center intermediate said members, means limiting the relative angular movement of said detents, and means for shifting said pivotal center whereby either one or the other of said members may be shifted or both of said members may be locked.

In testimony whereof, I affix my signature.

EVERETT G. CLEMENTS.